United States Patent [19]

Hachisu et al.

[11] 4,104,206
[45] Aug. 1, 1978

[54] PROCESS FOR REPROCESSING ATACTIC POLYPROPYLENE

[75] Inventors: Takeshi Hachisu; Akinari Uchida, both of Niihari, Japan

[73] Assignee: Hitachi, Ltd., Japan

[21] Appl. No.: 667,470

[22] Filed: Mar. 17, 1976

[30] Foreign Application Priority Data

Mar. 19, 1975 [JP] Japan ................................. 50-32220

[51] Int. Cl.² .............................................. C08F 6/00
[52] U.S. Cl. .................................... 260/2.3; 528/490; 528/491
[58] Field of Search ................. 260/2.3; 528/481, 490, 528/491; 427/202; 428/40, 352; 264/131, 140, 141, 142, 143

[56] References Cited

U.S. PATENT DOCUMENTS

| 3,027,271 | 3/1962 | Plasse et al. ................ 427/202 X |
| 3,210,301 | 10/1965 | White .......................... 260/2.3 X |
| 3,311,601 | 3/1967 | Conley ............................ 528/481 |
| 3,331,729 | 7/1967 | Danielson et al. ................. 428/40 |
| 3,386,488 | 6/1968 | Ratzsch et al. ................ 528/481 X |
| 3,489,710 | 1/1970 | Bonotto et al. ................ 260/2.3 X |
| 3,554,835 | 1/1971 | Morgan ........................ 428/352 X |
| 3,634,385 | 1/1972 | Walles et al. .................... 528/490 |
| 3,634,570 | 1/1972 | Himebreich, Jr. et al. ......... 264/130 |
| 3,640,912 | 2/1972 | Reinhard ............................ 260/2.3 |

FOREIGN PATENT DOCUMENTS 1,334,718  10/1973  United Kingdom.

Primary Examiner—Thomas De Benedictis, Sr.
Attorney, Agent, or Firm—Craig & Antonelli

[57] ABSTRACT

A plastic by-product can be reprocessed by embrittling the plastic by-product at a low temperature, crushing the embrittled by-product to about the same particle size as that of the virgin plastic, adding fine powder of the same or other material to the thus crushed by-product in order that the fine powder is deposited onto the surface of the crushed by-product, and then raising the temperature of the by-product to room temperature. The thus obtained reprocessed material can effectively be utilized as a bulking filler for the virgin plastic or for the other uses.

4 Claims, 1 Drawing Figure

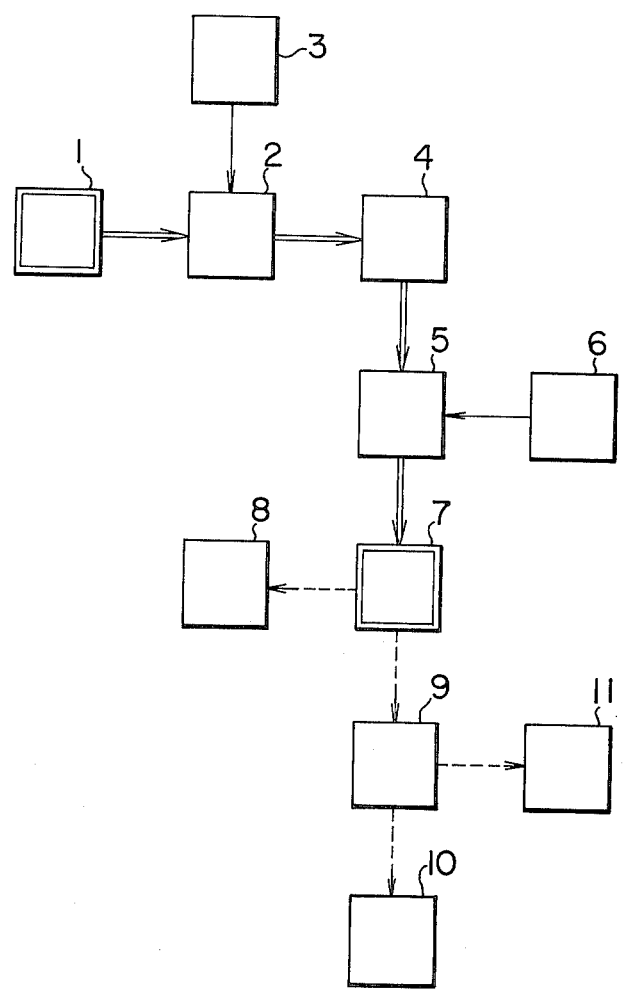

PROCESS FOR REPROCESSING ATACTIC POLYPROPYLENE

BACKGROUND OF THE INVENTION

The present invention relates to a process for reprocessing plastic by-products.

In the preparation of plastics, by-products are necessarily formed in the polymerization step. In the preparation of polypropylene, for example, atactic polypropylene is formed in the intermediate step. The amount of the atactic polypropylene formed is 5 to 10% by weight based on the total weight of polypropylene. This by-product, that is, atactic polypropylene is nowadays chipped and used as a fuel, or burned in a special furnace, or incorporated into asphalt for road paving. However, the amount of the by-product used is very small as compared with the amount thereof formed. Thus, there is a limited demand for it. In some cases, atactic polypropylene contains titanium tetrachloride as a catalyst according to the polymerization procedure. In such cases, hydrogen chloride is generated on heating or burning and it may cause the second environmental pollution. Also, it causes troubles in environmental protection to discard the by-product simply. Therefore, the by-product must be tipped carefully for land-fill. Further, it is difficult owing to its strong tackiness to crush the by-product at room temperature. At any rate, one is nowadays at a loss how to treat the by-product.

An object of the present invention is to provide a process for reprocessing plastic by-products according to which a reprocessed material utilizable effectively as a bulking filler for the virgin plastic or for the other uses can be obtained.

SUMMARY OF THE INVENTION

According to the present invention, a plastic by-product which is normally tacky and difficult to crush can be reprocessed by embrittling the plastic by-product at a low temperature, crushing the embrittled by-product to about the same particle size as that of the virgin plastic, adding fine powder of any allowable material such as, for example, polypropylene to the thus crushed by-product, and then raising the temperature of the by-product to room temperature. The thus obtained reprocessed material can effectively be utilized as, for example, a bulking filler for the virgin plastic or for the other uses.

BRIEF DESCRIPTION OF THE DRAWING

The accompanying drawing is a schematic representation of a most preferable embodiment of the present invention.

DESCRIPTION OF THE PREFERRED EMBODIMENTS

The process of the present invention comprises crushing and reprocessing a plastic by-product which is normally in the form of lumps like, for example, atactic polypropylene or is normally tacky like, for example, natural rubber. The process of the present invention will be explained below referring to atactic polypropylene.

As described above, atactic polypropylene is normally tacky like natural rubber and thereby it is almost impossible to crush it to almost the same particle size as that of the virgin plastic (pellet) by a usual mechanical method. At a temperature as low as $-20°$ to $-30°$ C, however, it is embrittled, and the embrittled by-product is very easy to crush. The present invention is based on this low-temperature embrittleness of atactic polypropylene.

Referring to the accompanying drawing, tacky atactic polypropylene in the form of lumps 1 is fed into a cooling apparatus 2 to which a coolant such as liquid nitrogen or cooling air is supplied from a coolant supply apparatus 3. The atactic polypropylene 1 is cooled to its brittleness temperature, that is, about $-30°$ C in the cooling apparatus 2. The thus cooled atactic polypropylene 1 is then sent to a crusher 4, where the atactic polypropylene is crushed to about the same particle size as that of the virgin plastic (pellet), and sent to a stirring apparatus 5. To the stirring apparatus 5 is supplied continuously fine powder of any allowable substance from a powder supply apparatus 6. As the substance, any substance which is suited to the use of the reprocessed material may be used. For example, when the reprocessed material is to be used as a bulking filler for the virgin plastic, polypropylene is suitable. Also, when the reprocessed material is to be used for the other objects, any other plastic fine powder is suitable. In some cases, starch powder or any other cheap grain powder may be used. The particulate atactic polypropylene 1 is stirred together with the fine powder. Thus, the fine powder is deposited onto the surface of the particulate atactic polypropylene. The temperature of the atactic polypropylene is then raised to room temperature. In this case, the particulate material is softened but the normally non-tacky fine powder is deposited onto the surface of the particulate material. Therefore, a free-flowing reprocessed material 7 can be formed the particles of which do no more cling to each other. This reprocessed material 8 can be utilized for various uses, for example, as a bulking filler for the virgin plastic. As the other methods of utilization, the reprocessed material can be converted into an oil of good quality 10 by passing it through a thermal decomposition apparatus 9, or it is possible to obtain a gas 11.

As described above, plastic by-products which are difficult to treat can be utilized effectively according to the present invention.

What is claimed is:

1. A process for reprocessing normally tacky atactic polypropylene, produced in the preparation of a particulate polypropylene, to a freeflowing particulate form comprising
    (a) cooling the tacky atactic polypropylene at a low temperature sufficient to cause embrittlement of said atactic polypropylene;
    (b) crushing the embrittled atactic polypropylene to about the same particle size as that of said polypropylene;
    (c) depositing a non-tacky fine powder on the surface of said particulate atactic polypropylene; and
    (d) raising the temperature of said particulate atactic polypropylene having a surface deposit of said fine powder to room temperature where said particular atactic polypropylene is free-flowing.

2. A process according to claim 1, wherein said non-tacky fine powder is polypropylene powder.

3. A process according to claim 1, wherein said non-tacky fine powder is grain powder.

4. A process according to claim 1, wherein said non-tacky fine powder is starch powder.

* * * * *